United States Patent [19]
Yamamoto et al.

[11] Patent Number: 6,134,198
[45] Date of Patent: *Oct. 17, 2000

[54] OPTICAL DISC APPARATUS AND TRACKING ERROR SIGNAL CALCULATION CIRCUIT

[75] Inventors: Etsufumi Yamamoto; Yoshihiro Kobayashi, both of Chiba, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/929,189

[22] Filed: Sep. 8, 1997

[30] Foreign Application Priority Data

Sep. 12, 1996 [JP] Japan .................. 08-242386

[51] Int. Cl.⁷ .................................................. G11B 7/09
[52] U.S. Cl. .................................... 369/44.35; 369/44.41; 369/44.36; 369/44.29
[58] Field of Search .............................. 369/44.34, 44.35, 369/44.36, 44.29, 44.41, 44.26, 44.23

[56] References Cited

U.S. PATENT DOCUMENTS

| | | | |
|---|---|---|---|
| 4,669,072 | 5/1987 | Miura et al. | 369/44 |
| 4,831,613 | 5/1989 | Kanda | 369/109 |
| 4,932,013 | 6/1990 | Kojima et al. | 369/32 |
| 4,974,220 | 11/1990 | Harada | 369/44.26 |
| 5,113,386 | 5/1992 | Whitehead et al. | 369/44.41 |
| 5,138,596 | 8/1992 | Yamada | 369/44.29 |
| 5,144,614 | 9/1992 | Kume et al. | 369/112 |
| 5,151,888 | 9/1992 | Shikichi et al. | 369/44.32 |
| 5,181,195 | 1/1993 | Kume et al. | 369/44.34 |
| 5,247,501 | 9/1993 | Hashimoto et al. | 369/44.11 |
| 5,268,886 | 12/1993 | Nagashima et al. | 369/44.41 |
| 5,289,443 | 2/1994 | Maeda et al. | 369/44.36 |
| 5,361,244 | 11/1994 | Nakamura et al. | 369/44.23 |
| 5,426,625 | 6/1995 | Bui et al. | 369/44.32 |
| 5,606,545 | 2/1997 | Horimai et al. | 369/124 |
| 5,650,987 | 7/1997 | Kadowaki | 369/44.34 |
| 5,684,783 | 11/1997 | Horimai et al. | 369/124 |
| 5,875,157 | 2/1999 | Sasaki et al. | 369/44.41 |
| 5,963,516 | 10/1999 | Hashimoto et al. | 369/44.29 |

FOREIGN PATENT DOCUMENTS

0597697 A1  5/1994  European Pat. Off. .
0740293 A2 10/1996  European Pat. Off. .

OTHER PUBLICATIONS

"Optical Disc Technology", Supervised by Morio Onoe, Radio Gijutsusha, Published Oct. 1, 1989, pp. 91–98.

Primary Examiner—Thang V. Tran
Attorney, Agent, or Firm—Limbach & Limbach, LLP

[57] ABSTRACT

A tracking error signal calculation circuit has peak detection multiplication circuits which detect the peaks of the detection signals of left and right regions of a photodiode and multiply a coefficient for detecting the deviation of the beam light with respect to the track of the disc recording medium, subtraction circuits for removing an offset by subtracting these multiplication results from the detection signals, and a subtraction circuit which calculates a difference of the signal obtained by removing the offset (performs push-pull operation) and outputs a tracking error signal. The value of the coefficient can be changed by adding an alignment signal to the detection signal. In order to impart the frequency dependency to this coefficient, the alignment signal is added to the signal through a filter.

19 Claims, 15 Drawing Sheets

GND

FIG. 15A  SLED
FIG. 15B  TRACKING DRIVER
FIG. 15C  ENABLE
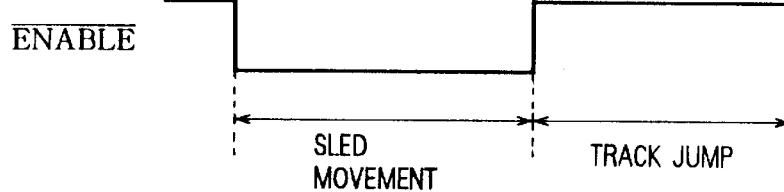
SLED MOVEMENT | TRACK JUMP
FIG. 16A  SLED MOVEMENT
FIG. 16B  TRACKING SERVO
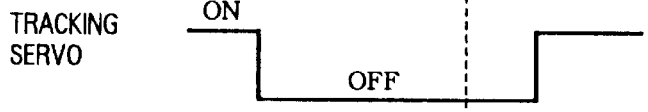
ON / OFF
FIG. 16C  CENTER-POINT SERVO
20~30ms

OPTICAL DISC APPARATUS AND TRACKING ERROR SIGNAL CALCULATION CIRCUIT

BACKGROUND OF THE INVENTION

1. Field of the Invention

The present invention relates to a compact disc apparatus (CD), CD-ROM, mini disc apparatus (MD: registered trademark of SONY), or other optical disc apparatus.

Further, the present invention relates to a tracking error signal calculation circuit used in the optical disc apparatus.

2. Description of the Related Art

An optical pick-up is used for recording data or reading recorded data along a track (guide groove) of a disc recording medium of an optical disc apparatus. In the optical pick-up, optical parts such as a semiconductor laser, photo-diode (PD), prism, and object lens are mounted.

At the time of recording or reading data to or from the disc recording medium, in order to eliminate the influence of the face vibration and wobbling of the track of the disc recording medium, and the face vibration and wobbling by the tilting of the turntable of the disc drive and precession motion, and the like, focusing servo control and track servo control are carried out.

In focusing servo control, the object lens for focusing (exactly focusing) the laser beam light emitted from a semiconductor laser on the recording surface of the disc recording medium is positioned with respect to the surface of the disc recording medium.

In tracking servo control, the optical pick-up is positioned in the radial direction of the disc recording medium to position the laser beam emitted from the laser at a desired track of the disc recording medium (to place it on-track).

A focus error signal is used for the focusing servo control, while a tracking error signal is used for the tracking servo control.

Usually, signals detected by two photodiodes are computed by the push-pull system to calculate the tracking error signal.

An offset will appear in the tracking error signal due to the push-pull system. When there is an offset, even if the tracking error signal indicates 0, if the tracking servo control is carried out by using that tracking error signal, the beam of light of the semiconductor laser will deviate from the center of the track, so it suffers from a disadvantage of poor control when performing the tracking control.

As factors behind the appearance of the offset in the tracking error signal, there are deviation of the optical axis of the object lens, tilting of the disc recording medium in the radial direction, an imbalance in groove shape on the disc recording medium, etc.

As the method for reducing the offset due to the above factors, a variety of countermeasures have been made. For example, refer to "Optical Disc Technology", supervised by Morio Onoe, Radio Gijutsusha, page 91 to page 98.

The inventors of the present application found that just the above-mentioned countermeasures for reducing the offset were not sufficient and that offset still existed in the tracking error signal. Accordingly, when using a tracking error signal calculated by the conventional push-pull system, the problem is encountered that accurate and stable tracking servo control cannot be carried out in the optical disc apparatus.

SUMMARY OF THE INVENTION

An object of the present invention is to provide a circuit capable of correctly calculating the tracking error signal used in the optical disc apparatus and an optical disc apparatus using this.

Further, another object of the present invention is to provide a tracking error signal calculation circuit in which the signal adjustment is convenient.

Further, still another object of the present invention is to optimize the configuration of an optical pick-up in which the signal adjustment is easy and the related apparatuses thereof considering factors due to the structure of the optical disc apparatus.

According to the present invention, there is provided a tracking error signal calculation circuit for calculating a tracking error signal in an optical disc apparatus having a light receiving means for outputting first and second received light detection signals from regions located at the two sides of the center of a track of a disc-like recording medium, said circuit having: a first calculation circuit for detecting a peak of the first received light detection signal from the light receiving means and subtracting a signal obtained by multiplying a first coefficient with the peak from the first received light detection signal to calculate a first calculation signal; a second calculation circuit for detecting a peak of the second received light detection signal from the light receiving means and subtracting a signal obtained by multiplying a second coefficient with the peak from the second received light detection signal to calculate a second calculation signal; and a third calculation circuit for subtracting the second calculation signal from the first calculation signal to calculate the tracking error signal.

In the present invention, by detecting the peak of the first received light detection signal, multiplying the coefficient with this, and subtracting the same from an original first received light detection signal, the offset contained in the first received light detection signal is eliminated. This same is true also for the second received light detection signal. When the tracking error signal is calculated by using the thus signal-processed signal, the offset can be cancelled.

Preferably, a first coefficient changing circuit for changing the first coefficient in the first calculation circuit can be added. Also, preferably, a second coefficient changing circuit for changing the second coefficient in the second calculation circuit can be added. There are variations in characteristics of optical disc apparatus, therefore the coefficients, can be changed so as to match the same with the characteristics of the optical disc apparatus.

Further preferably, the coefficients can be changed in response to the frequency bands of the detection signals. Particularly, the coefficients can be changed so that the coefficient becomes large in a low region.

Further, according to the present invention, there is provided an optical disc apparatus having a disc recording medium, an optical pick-up, a signal calculation circuit provided outside of the optical pick-up, and a tracking controlling means for performing the position control of the optical pick-up to a predetermined track, wherein the optical pick-up has an optical means for emitting a converged beam to a recording surface of the disc recording medium, a light receiving means for receiving the returned light from the recording surface of the disc recording medium from regions located at the two sides of the center of track of the disc recording medium and outputting the first and second received light detection signals, a first calculation circuit for detecting a peak of the first received light detection signal from the light receiving means and subtracting a signal obtained by multiplying a first coefficient to the peak from the first received light detection signal to calculate the first calculation signal, and a second calculation circuit for detecting a peak of the second received light detection signal from the light receiving means and subtracting a signal obtained by multiplying a second coefficient with the peak from the second received light detection signal to calculate the second calculation signal; and the signal calculation circuit has a third calculation circuit subtracting the second calculation signal from the first calculation signal to calculate the tracking error signal.

The constituent elements are divided as described above and further the tracking error signal is calculated by the above circuit configuration and used for the tracking servo control.

Preferably, a coefficient changing circuit for changing the first coefficient in the first calculation circuit can be added. Also, preferably, a coefficient changing circuit for changing the second coefficient in the second calculation circuit can be added. There variations in characteristics of the optical disc apparatus, therefore the coefficients can be changed so as to match the same with the characteristics of the optical disc apparatus.

Further preferably, the coefficient is changed in accordance with the frequency bands of the detection signals. Particularly, the coefficients can be changed so that the coefficient becomes large in a low region.

Preferably, the light receiving means has two light receiving elements provided along a light axis of the returned light; the first light receiving element is provided so as to receive the returned light from the recording surface of the disc recording medium from regions located at the two sides of the center of the track of the disc recording medium and output the first and second signals; the second light receiving element is provided so as to receive the returned light from the recording surface of the disc recording medium from regions located at the two sides of to the center of the track of the disc recording medium and output third and fourth signals in an inverse phase relationship from corresponding regions of the light axis; and the light receiving means adds the first signal and fourth signal in the same phase relationship, outputs the same as the first received light detection signal, adds the second signal and third signal which are in the inverse phase relationship to the first received light detection signal, but in the same phase relationship as each other, and outputs the same as the second received light detection signal.

When two light receiving elements are used as mentioned above, the common mode noise rejection ratio can be raised and the noise resistance raised.

According to the present invention, there is provided a tracking control apparatus in an optional disc apparatus, for reproducing a signal from and/or for recording a signal to a disk-like recording medium, said tracking control apparatus comprising: a light collection means for collecting a light beam emitted from a light source toward the disc-like recording medium; a light receiving means, comprising first and second divided light receiving element groups, for receiving a light beam reflected at the disc-like recording medium to output first and second light received detection signals corresponding to regions positioned at both sides with respect to a signal track center of the disc-like recording medium, a first calculation means for calculating a first calculation signal from the first received light detection signal detected at the light receiving means by using a first coefficient; a second calculation means for calculating a second calculation signal from the second received light detection signal detected at the light receiving means by using a second coefficient; a coefficient changing means for changing the first and second coefficients; a third calculation means for calculating a tracking error signal from the first and second calculation signals; and a tracking servo means for tracking-servo-controlling the light collection means by using the tracking error signal calculated at the third calculation means.

Preferably, the light collection means forms a single light spot of the light beam on the disc-like recording medium.

Also, preferably, the coefficient changing means comprises a circuit for changing the first and second coefficients in response to frequencies of the first and second received light detection signals.

According to the present invention, there is also provided a tracking error signal calculation method for calculating the tracking error signal in an optical disc apparatus having a light receiving means for outputting first and second received light detection signals from regions located at the two sides of the center of a track of a disc-like recording medium, said method comprising the steps of: detecting a peak of the first received light detection signal from the first received light detection signal and subtracting the signal obtained by multiplying a first coefficient with the peak from this to calculate a first calculation signal; detecting a peak of the second received light detection signal from the second received light detection signal and subtracting the signal obtained by multiplying a second coefficient with the peak from this to calculate a second calculation signal; calculating on the first calculation signal and the second calculation signal or one of them so that the first coefficient and the second coefficient or one of them changes in response to the frequency band; and generating the tracking error signal by subtracting the second calculation signal from the first calculation signal.

BRIEF DESCRIPTION OF THE DRAWINGS

These and other objects and features of the present invention will become clearer from the following description of the preferred embodiments made with reference to the appended drawings, in which:

FIGS. 4A to 4C are views illustrating the operation for detecting the tracking error signal when using the four-division photodiodes shown in FIG. 3, in which FIG. 4A shows a state of detracking to the (+) side; FIG. 4B shows an on-track state; and FIG. 4C shows a state of detracking to the (−) side;

FIGS. 15A–15C are operation timing charts for making the sled perform a track jump operation; and FIGS. 16A–16C are timing charts showing the operation of the middle point servo control.

DESCRIPTION OF THE PREFERRED EMBODIMENTS

As an embodiment of the present invention, as the optical disc apparatus, for example, an optical-magneto (magneto-optical) disc apparatus, CD, CD-ROM, etc. may be mentioned. As the tracking error signal calculation circuit of the present invention, a circuit for calculating the tracking error signal used in the tracking servo control of these optical disc apparatuses etc. may be mentioned.

First, in order to facilitate clearer understanding of the present invention, an explanation will be made of the basics of a tracking error signal used for example in a magneto-optical disc apparatus or CD or CD-ROM or other optical disc apparatus.

Laser Coupler LC

Figure 1:
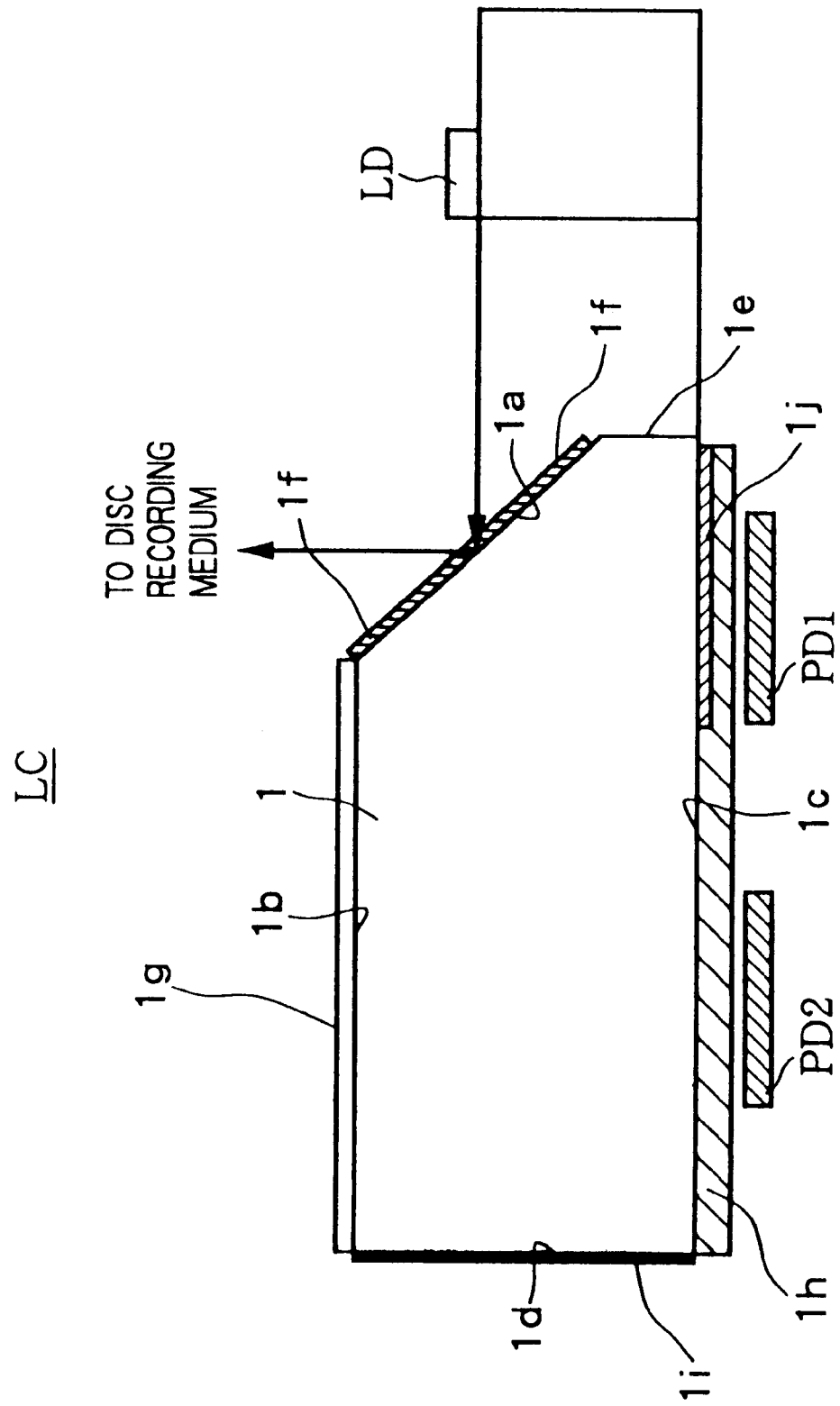
FIG. 1 is a view showing a cross-section of a laser coupler and a path of a beam with respect to a disc recording medium located above the same.

FIG. 1 is a view of a cross-section of a laser coupler LC mounted on an optical pick-up and the path of a beam with the disc recording medium (not illustrated) located above it.

The laser coupler LC is provided with a semiconductor laser LD, two photodiodes PD1 and PD2, and a microprism 1.

The microprism 1 has a 45 degree inclined surface 1a or receiving the light from the semiconductor laser LD, an upper surface 1b, a lower surface 1c, and a back surface 1d. A half mirror layer 1f is coated on the 45 degree inclined surface 1a, a full reflection mirror layer 1g is coated on the upper surface 1b, an AR (anti-reflection) coating layer 1h is coated on the lower surface 1c, and a full surface absorbing film 1i is coated on the back surface 1d. Further, a half mirror layer 1j is arranged on the lower surface of the microprism 1 above where the photodiode PD1 is arranged.

The two photodlodes PD1 and PD2 are arranged at the lower surface of the microprism 1 spaced a predetermined distance from the same so as to be able to detect signals with a predetermined phase difference. The light emitted from the semiconductor laser LD is reflected at the half mirror layer 1f on the inclined surface 1a of the mlcroprism 1 and is directed toward a not illustrated disc recording medium above this. The returned light reflected at the disc recording medium enters into the microprism 1 from the half mirror layer 1f on the inclined surface 1a of the microprism 1 and strikes the photodiode PD1 (front PD). The light reflected from there is reflected at the upper surface of the microprism 1 and strikes the photodiode PD2 (rear PD).

Three-division System Tracking Error Signal

Figure 2:
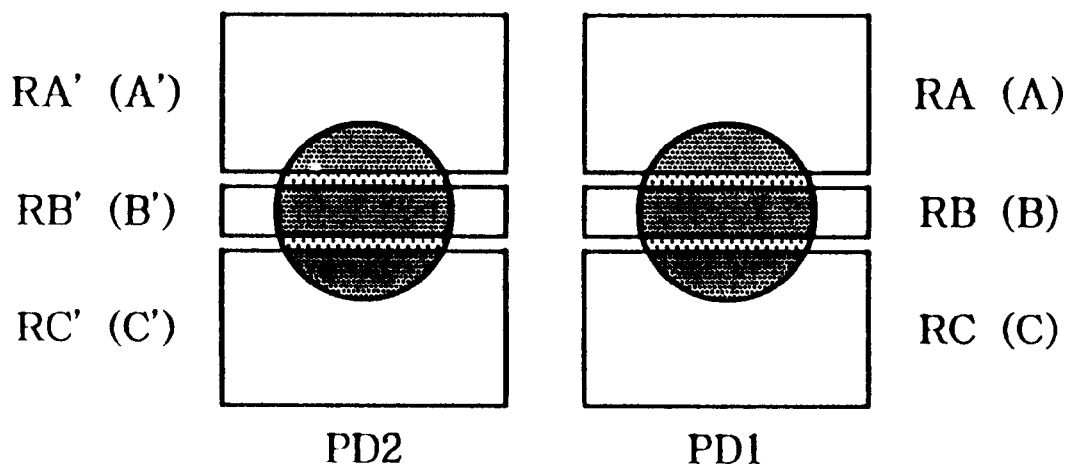
FIG. 2 is a plan view of three-division photodiodes of two photodiodes (front PD and rear PD) shown in FIG. 1.

FIG. 2 is a plan view of the three-division photodiodes used as the photodiodes PD1 and PD2 shown in FIG. 1.

The photodiodes PD1 and PD2 are respectively divided into three regions: RA, RB, and RC and RA', RB', and RC'. The regions are divided by a division line extended along a direction orthogonal to the direction in which detracking occurs. The center regions RB and RB' have the same surface areas, the regions RA and RA' on the outside thereof have the same surface areas, the regions RC and RC' have the same surface areas, and the surface areas of the regions RA and RC and regions RA' and RC' are the same. Further, the surface areas of these regions are defined so that the amount of light received at the region RB (RB') is equal to the sum of the amounts of lights received at the regions RA and RC (RA' and RC') at the time of an on-track state.

In a three-division system tracking error signal TE, the center region RB corresponds to the track center. The occurrence of detracking either above or below this region RB is detected, so in the same way as a two-division photodiode, the difference of the detection signals of the outside regions RA and RC (A–C), that is, a push-pull signal, is calculated.

Four-division System Tracking Error Signal

Figure 3:
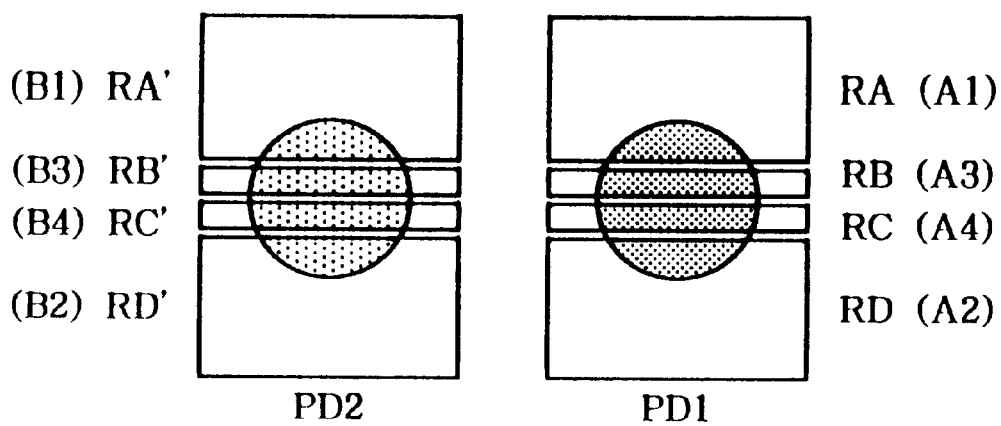
FIG. 3 is a plan view of four-division photodiodes of the photodiodes (front PD and rear PD) shown in FIG. 1.

FIG. 3 is a plan view of four-division photodlodes used as the photodiodes PD1 and PD2 shown in FIG. 1.

Referring to the photodiode PD1 (front PD), the surface areas of the center region RB and center region RC are equal, and the surface areas of the outside region RA and outside region RD are equal. The amounts of the light received at the regions RB and RC are defined so as to become the same as those of the light received at the regions RA and RD at the time of an exact focus. The signals A1, A3, A4, and A2 are detected from the regions RA, RB, RC, and RD of the front PD.

In the same way as above for the photodiode PD2 (rear PD), the surface areas of the center region RB' and center region RC' are equal, and the surface areas of the outside region RA' and outside region RD' are equal. The amounts of the light received at the regions RB' and RC' are defined so as to become the same as those of the light received at the regions RA' and RD' at the time of an exact focus. The signals B1, B3, B4, and B2 are detected from the regions RA', RB', RC', and RD' of the front PD.

In the embodiment, since the division regions of the photo-diodes PD1 and PD2 are defined on the basis of the amount of the received light when the focus error signal can be calculated on the basis of the signals A1 to A4 and B1 to B4 detected at the light receiving regions.

Figure 4:
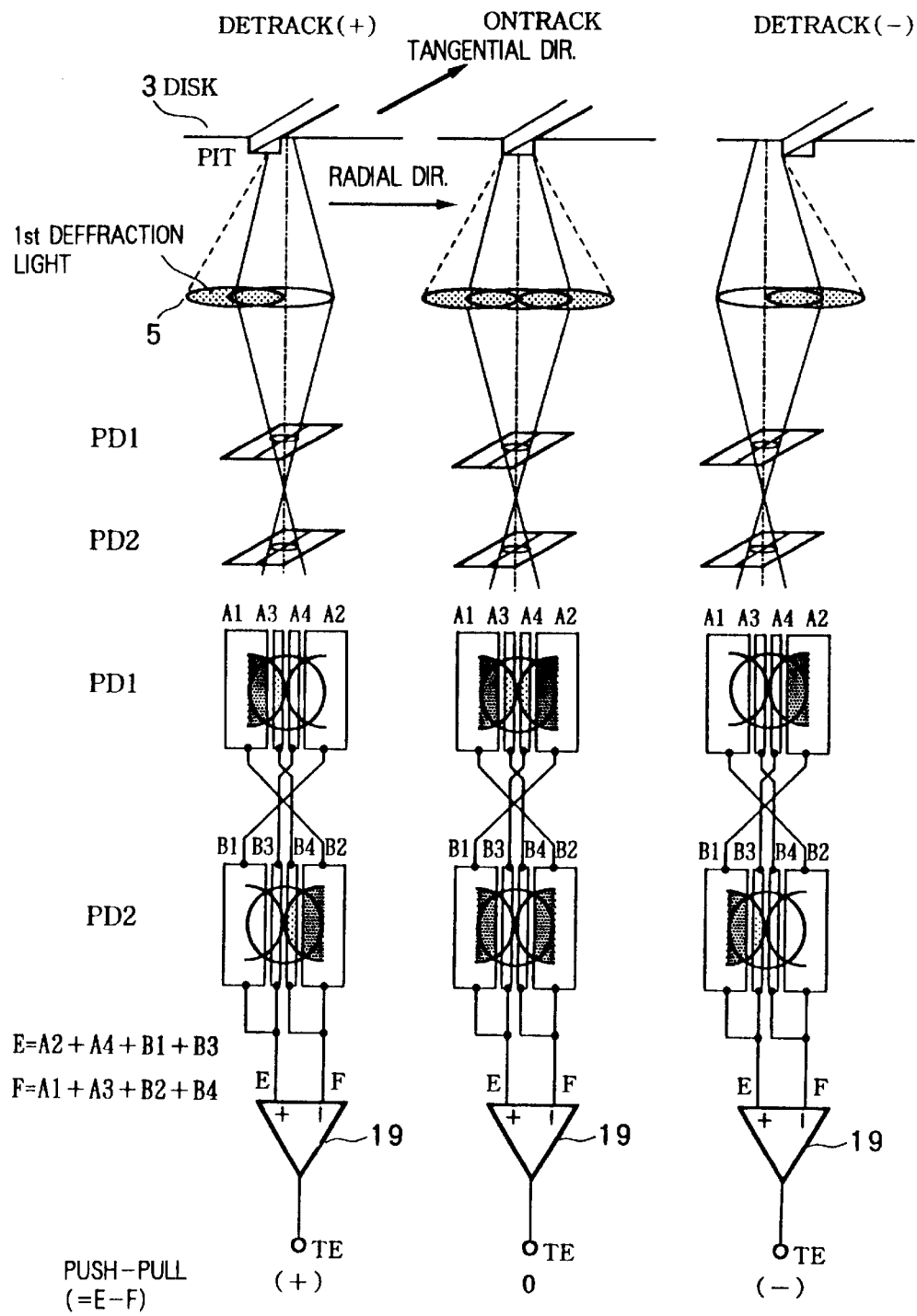

FIG. 4 is a view illustrating the operation for detecting the tracking error signal TE when using the four-division photodiodes PD1 and PD2. FIG. 4A shows a state of detracking to the (+) side; FIG. 4B shows an on-track state; and FIG. 4C shows a state of detracking to the (−) side.

Whether the apparatus is in the detracked or on-track state is judged by dividing each of the photodiodes PD1 and PD2 into two, i.e., the center left and right regions, and using the difference of the distribution of intensity of the primary diffraction light on these photodiodes PD1 and PD2. At the on-track state, the center of the divided regions of these photodiodes PD1 and PD2 is located at the center of the track.

The photodiodes PD1 and PD2 are arranged so that the detection signals from the same divided regions have an inverse phase relationship with respect to the returned light. Accordingly, the tracking error signal TE when using two photodiodes PD1 and PD2 is calculated by adding (A2+A4) and (B1+B3), which are signals having the same phase relationship, to calculate the first sum signal E, adding (A1+A3) and (B2+B4), which are signals similarly having the same phase relationship, to calculate the second sum signal F, and performing the push-pull processing of these sum signals.

In this way, signals having the same phase relationship are added so as to improve the common mode noise rejection ratio.

$$E = A2 + A4 + B1 + B3 \quad (1)$$

$$F = A1 + A3 + B2 + B4 \quad (2)$$

$$PP = E - F \quad (3)$$
$$= (A2 + A4 + B1 + B3) - (A1 + A3 + B2 + B4)$$

A differential amplification circuit 19 calculates the tracking error signal TE by the push-pull system shown in Equation 3.

As shown in FIG. 4B, the intensity distributions of the two primary diffraction lights become equal at the time of an on-track state, therefore the difference thereof, i.e., the tracking error signal TE, becomes 0.

As shown in FIG. 4A or FIG. 4C, the tracking error signal TE at the time of a detracking state exhibits a polarity of either of (+) or (−) since there is no primary diffraction light in the radial direction of either of (+) or (−).

Defects of Push-pull System

Below, a description will be made of the problems (defects) of the push-pull system.

First Problem: Offset of Tracking Error Signal Due to a Shift of the Object Lens in the Radial Direction (Tracking Direction)

Figure 5:
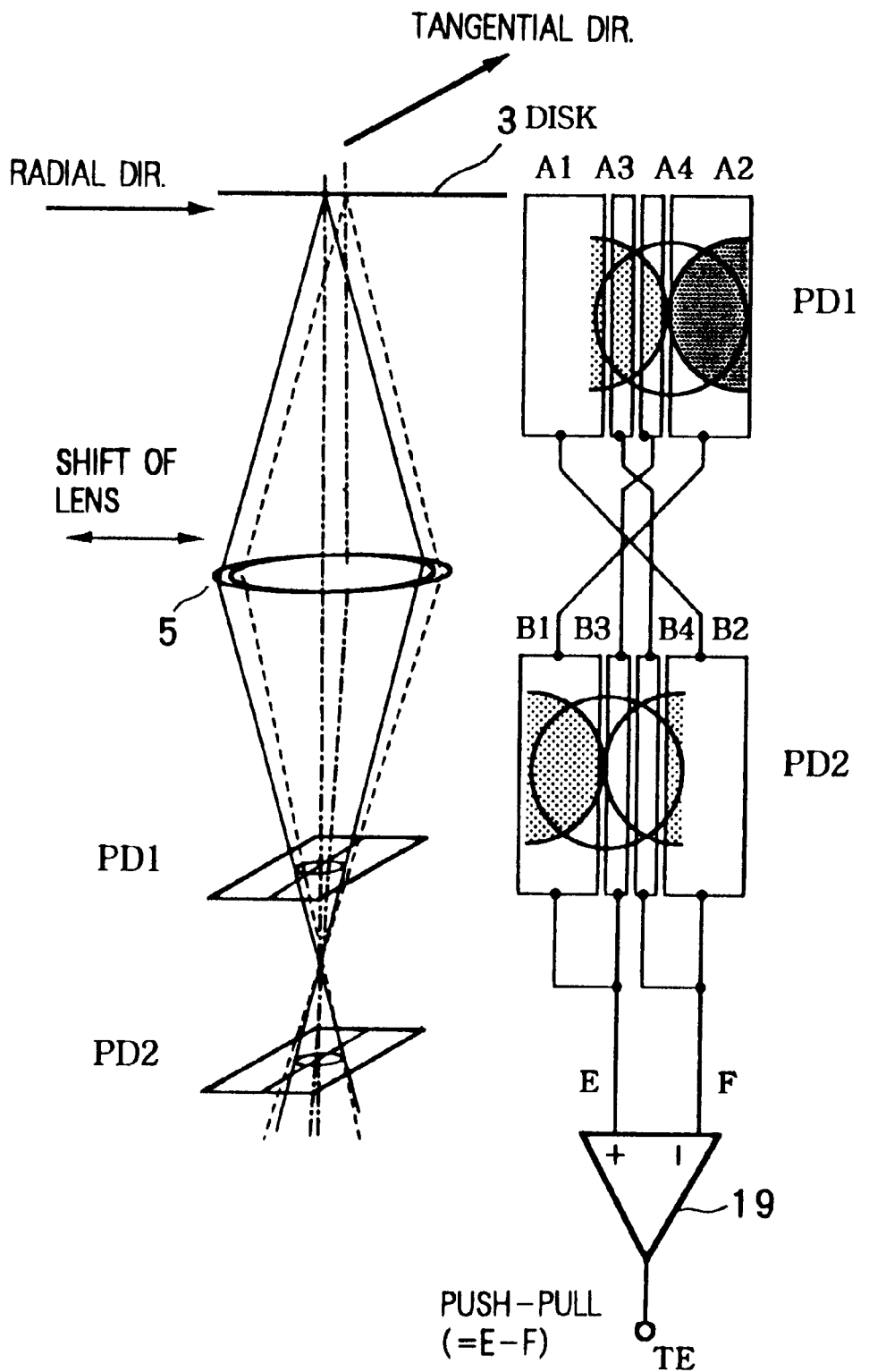
FIG. 5 is a view illustrating the push-pull signal when the object lens is deviated in a radial direction (tracking direction)

FIG. 5 is a view illustrating the push-pull signal when the object lens 5 is deviated in the radial direction (tracking direction).

When the object lens 5 shifts in the radial direction with respect to the disc recording medium 3, the returned lights on the photodiodes PD1 and PD2 are shifted as well, the intensity distributions of the photodiodes PD1 and PD2 become unbalanced, and a DC offset is caused in the push-pull signal. As a result, if the tracking servo control is performed using this push-pull signal, accurate tracking control cannot be carried out.

Second Problem: Offset of Tracking Error Signal Due to Radial Skew

Figure 6:
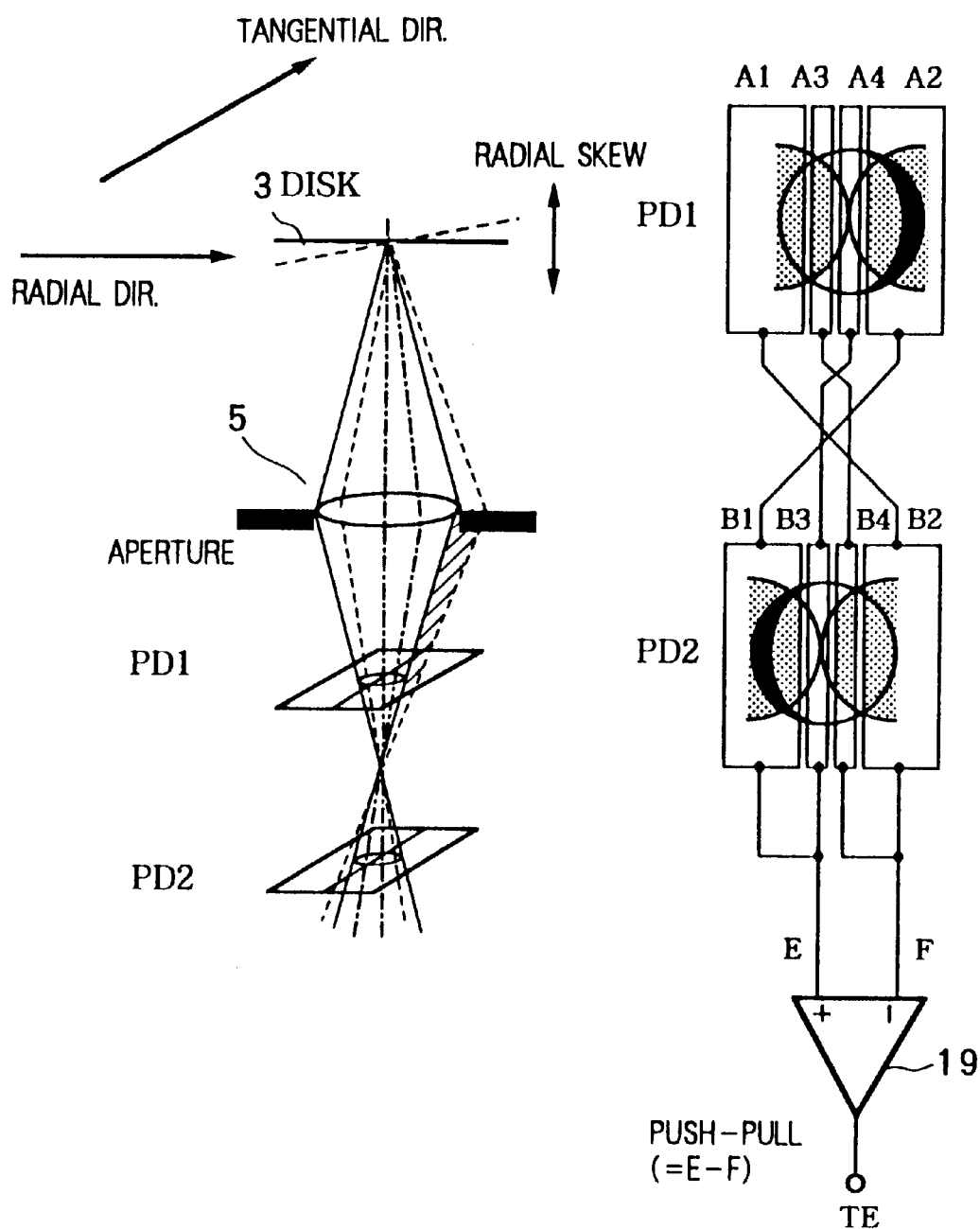
FIG. 6 is a view showing a state where the spot of the returned light on the photodiode shifts due to a radial skew of the disc recording medium.

FIG. 6 is a view of the state where the spots of the returned lights on the photodiodes PD1 and PD2 shift due to a radial skew of the disc recording medium 3.

When the disc recording medium 3 is skewed in the radial direction, the intensity distributions of the returned lights striking the photodiodes PD1 and PD2 become unbalanced and a DC offset occurs in the tracking error signal TE. As a result, when using the tracking error signal TE in this state, the tracking servo control cannot be correctly carried out.

An actual laser coupler LC rotates 45 degrees with respect to the pit. As a result, even if the disc recording medium 3 is skewed in the tangential direction, a DC offset occurs in the tracking error signal TE.

The amount of the offset becomes 1/1.41 in both of the radial direction and tangential direction since the laser coupler LC rotates by 45 degrees.

Due to the skew of the disc recording medium 3 mentioned above, in the same way as the case where the object lens 5 skews with respect to the disc recording medium 3, a DC offset will occur in the tracking error signal TE.

Principle of Present Invention: Top Hold Push-pull System

A description will be made next of the principle of the present invention for cancelling the offset due to the movement of the field of vision of the object lens explained above.

As the optical disc apparatus of the present invention, for example, a magneto-optical disc apparatus or CD or CD-ROM apparatus may be mentioned. Further, as the tracking error signal calculation circuit of the present invention, a circuit calculating the tracking error signal used in the tracking servo control in these optical disc apparatus may be mentioned.

Figure 7:
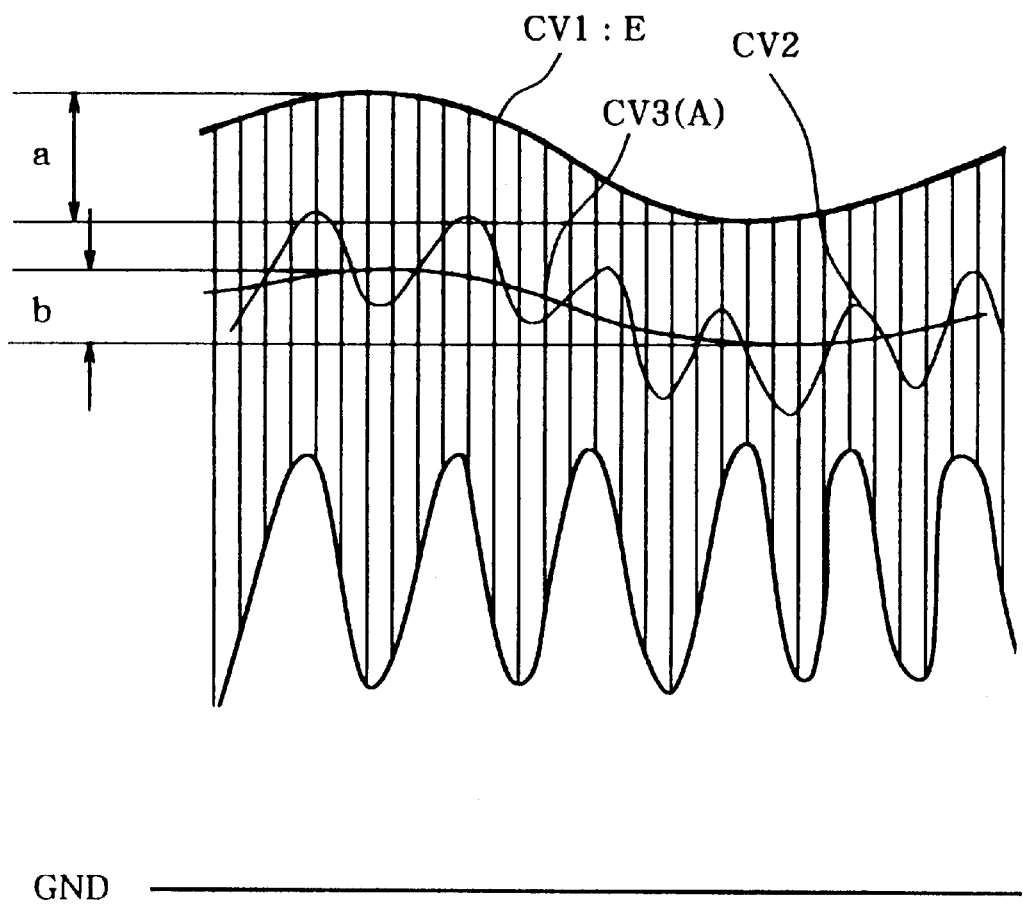
FIG. 7 is a graph showing various signal waveforms shown in FIG. 4A to FIG. 4C.

FIG. 7 is a graph showing a waveform of an RF envelope signal of the first sum signal E (=A2+A4+B1+B3) shown in FIGS. 4A to 4C and Equation 1.

A curve CV1 indicates a peak change of the RF envelope of the first sum signal E, due to the deviation of the object lens, skew, etc. The peak width is indicated as a.

A curve CV2 is a waveform of the signal when low pass filtering is applied to the tracking error signal TE used when applying the track servo control in the push-pull system.

A curve CV3 indicates the change of offset of the tracking error signal actually used. The signal thereof is defined as A, and the width thereof is defined as b.

In order to cancel the DC offset due to the shift of the object lens 5 or the skew of the disc recording medium 3, it is sufficient to subtract the offset width b indicated by the curve CV3 from the value indicated by the curve CV2.

While the description was made above of the cancellation of the offset for the first sum signal E, the same applies for the second sum signal F.

In the present invention, the push-pull signal is calculated after offsets are subtracted from the RF envelope of the first sum signal E and the RF envelope of the second sum signal F. As a result, the offset is removed from the tracking error signal.

First Embodiment: Basic Operation and Basic Circuit

Below, a detailed description will be made of a basic circuit of the first embodiment of the present invention and the operation thereof.

A constant K is determined so that the offset b becomes the product of the coefficient K and peak a, that is, b becomes equal to K×a, under the above conditions. Note that K<1. The signal obtained by cancelling the offset can be represented as (A−Ka). A denotes the first sum signal E or the second sum signal F. In the present invention, (A−Ka) is used for the calculation of the tracking error signal TE as the revised first sum signal or revised second sum signal.

Figure 8:
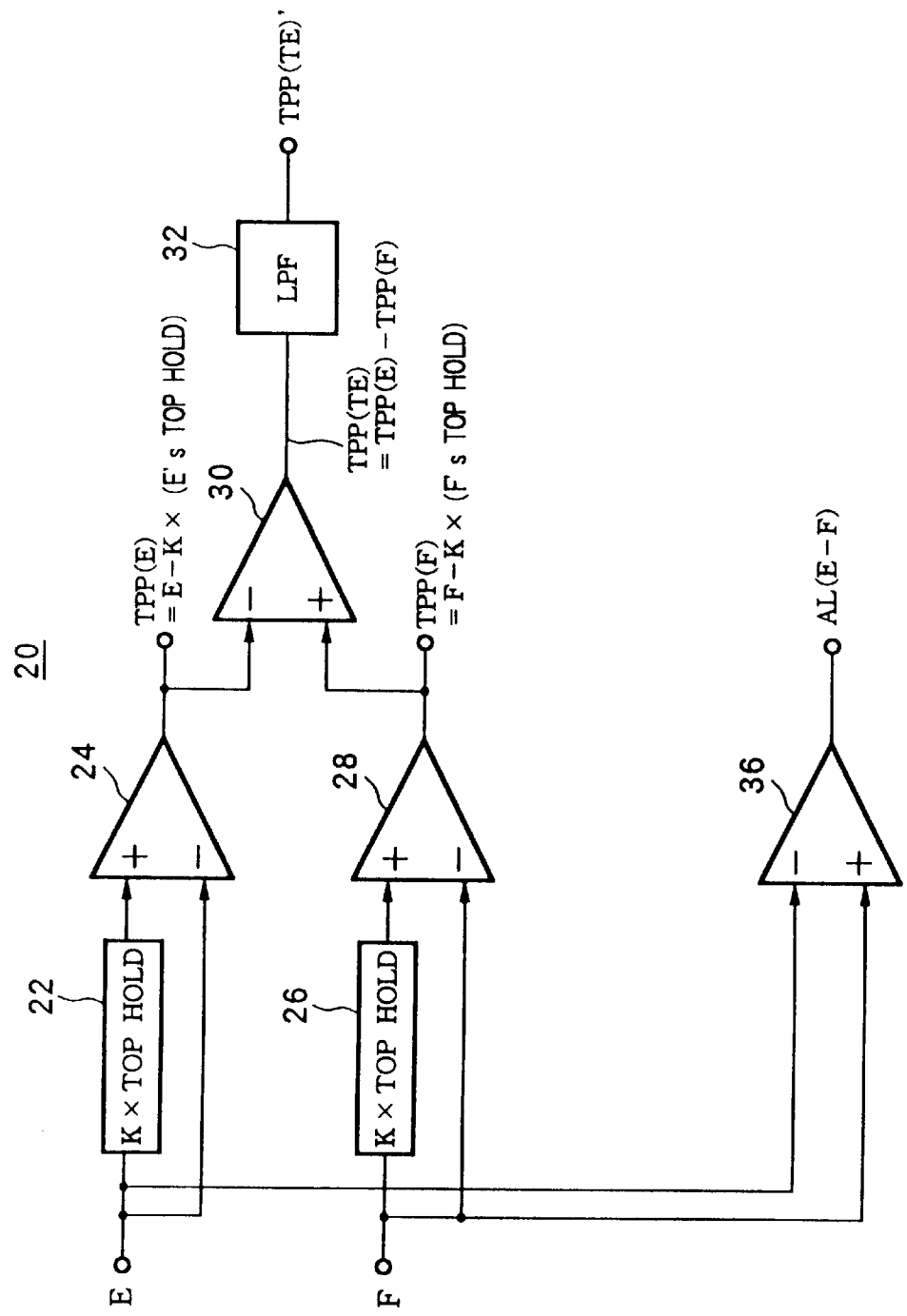
FIG. 8 is a view showing a circuit of a first embodiment for calculating the tracking error signal of the present invention.

FIG. 8 is a view of a basic circuit 20 (circuit of the first embodiment) for calculating the tracking error (TE) signal obtained by performing the offset correction mentioned above.

Assume that the first sum signal E and the second sum signal F are calculated at circuits including the operation circuit 19 illustrated in FIG. 4.

The top hold push-pull (TPP) signal calculation circuit 20 shown in FIG. 8 replaces the operation circuit 19 shown in FIGS. 4(A) to 4(C).

This top hold push-pull (tracking error) signal calculation circuit 20 has a top hold constant multiplication circuit 22 which detects the peak a of the first sum signal E, holds this, and multiplies the constant K with the result thereof, a differential amplification circuit 24 for calculating (E−K×a), a top hold constant multiplication circuit 26 which detects the peak a' of the first sum signal F, holds this, and multiplies the constant K with it, a differential amplification circuit 28 for calculating (F−K×a'), and a differential amplification circuit 30 for performing the push-pull operation on these calculated signals. The tracking error signal is output from the differential amplification circuit 30.

This tracking error signal calculation circuit 20 uses the peak hold constant multiplication circuits 22 and 26 for detecting the change of peak and multiplying the coefficient K with it so as to calculate (E−K×a) and (F−K×a').

(E−K×a) will be referred to as the first sum signal after top hold processing (abbreviated as the top hold first sum signal) TPP (E), and (F−K×a') will be referred to as the second sum signal after top hold processing (abbreviated as the top hold second sum signal) TPP (F), the constant K will be referred to as the TPP calculation coefficient, and the tracking error signal calculated at the circuit 30 will be referred to as the top hold tracking error signal TPP (TE). In this top hold tracking error signal TPP (TE), the offset is cancelled according to the above principle.

Further preferably, a low-pass filter circuit 32 provided in the rear of the circuit 30 is provided and a top hold tracking error signal TPP (TE)' passing the low frequency component of the top hold tracking error signal TPP (TE) from the circuit 30 is provided.

In the subtraction circuit 36 of FIG. 8, an alignment signal AL obtained by subtracting the second sum signal F from the first sum signal E can be calculated. A description will be made later of the utilization of the alignment signal AL.

Circuit of Embodiment 2

Figure 9:
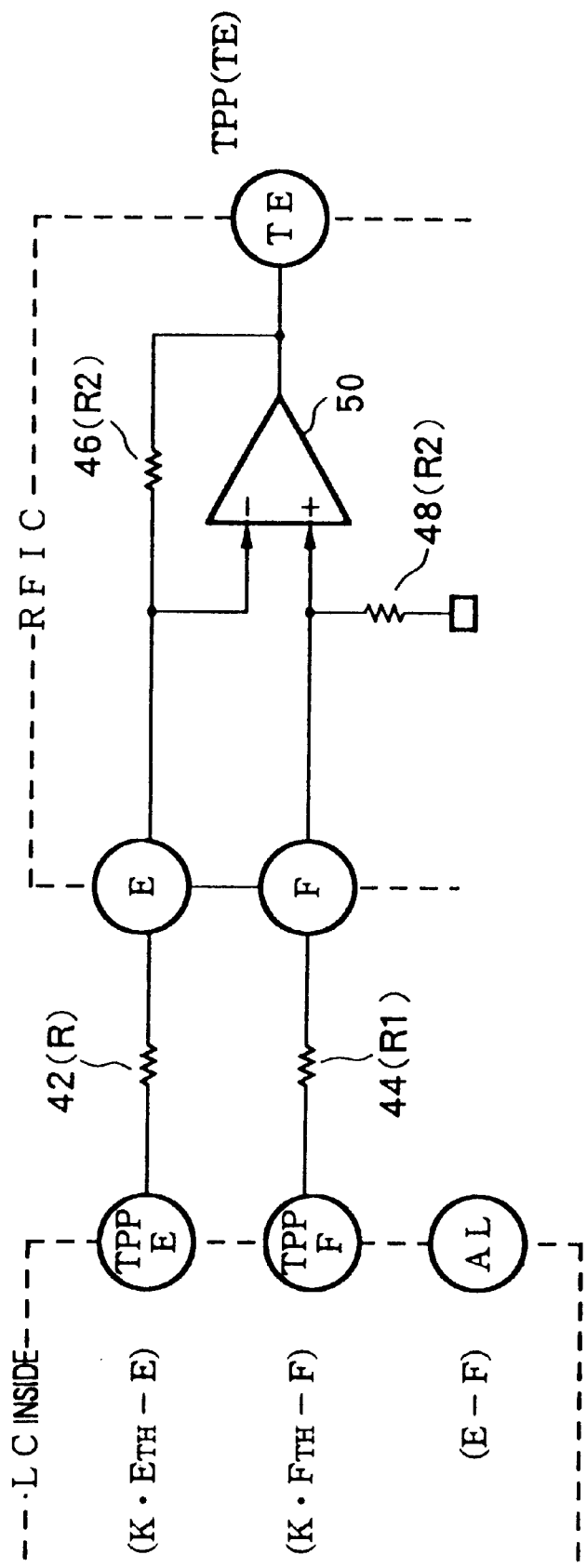
FIG. 9 is a view showing the circuit of a second embodiment for calculating the tracking error signal of the present invention.

FIG. 9 is a view of the circuit configuration of a second embodiment for calculating the top hold push-pull signal, that is, a top hold tracking error signal TPP (TE), from the top hold first sum signal TPP (E) and the top hold F signal TPP (F) obtained at the top hold push-pull signal calculation circuit 20 shown in FIG. 8.

The circuit configuration illustrated in FIG. 9 is designed considering the ease of adjustment of the final tracking error (TE) signal while making possible the output of the signal which becomes the base from the laser coupler LC as much as possible considering the fact that there are limits to the parts accommodated in the laser coupler LC.

The laser coupler LC accommodates the laser LD, photodiodes PD1 and PD2, and microprism 1 shown in FIG. 1. Further, the laser coupler LC accommodates the object lens 5 to amplification circuit 19 illustrated in FIG. 4 and the top hold constant multiplication circuits 22 and 26, amplification circuits 24 and 28, calculation circuit 30, LPF 32, and alignment signal AL calculation circuit 36 shown in FIG. 8. Namely, the laser coupler LC calculates the top hold first sum signal TPP (TE) and the top hold second sum signal TPP (F) and further calculates (E signal−F signal) as the alignment signal AL. These signals TPP (E), TPP (F), and AL are basic output signals as the laser coupler LC.

$$TPP\ (E) = K \times E_{TP} - E \qquad (5)$$

$$TPP\ (F) = K \times F_{TP} - F \qquad (6)$$

$$AL = E - F \qquad (7)$$

Where, $E_{TP}$ is a peak holding value of the E signal, $F_{TP}$ is a peak holding value of the F signal, and K is a TPP calculation coefficient (K<1).

At the time of calculation of the final tracking error (TE) signal, there is a high possibility of adjustment of gain. Therefore, resistors 42 and 44 having a resistance value R1 and a radio frequency integrated circuit RFIC are provided at the outside of this laser coupler LC. The radio frequency integrated circuit RFIC is provided with a differential amplification circuit 50, a negative feedback resistor 46 thereof, and a resistor 48. The resistance values of the negative feedback resistor 46 and the resistor 48 are R2.

The top hold tracking error signal TPP (TE) is represented by the following equation:

$$TPP(TE) = (R2/R1) \times [(K \times F_{TP} - F) - (K \times E_{TP} - E)] \qquad (8)$$

$$= (R2/R1) \times [(E - F) - K(E_{TP} - F_{TP})]$$

In the circuit of FIG. 9, if the resistance values R1 and R2 are appropriately adjusted at the outside of the laser coupler LC, the gain can be changed and a top hold tracking error signal TPP (TE) in which the gain is appropriately adjusted can be provided.

Actual Signal Processing Circuit of Laser Coupler 1c

Figure 10:
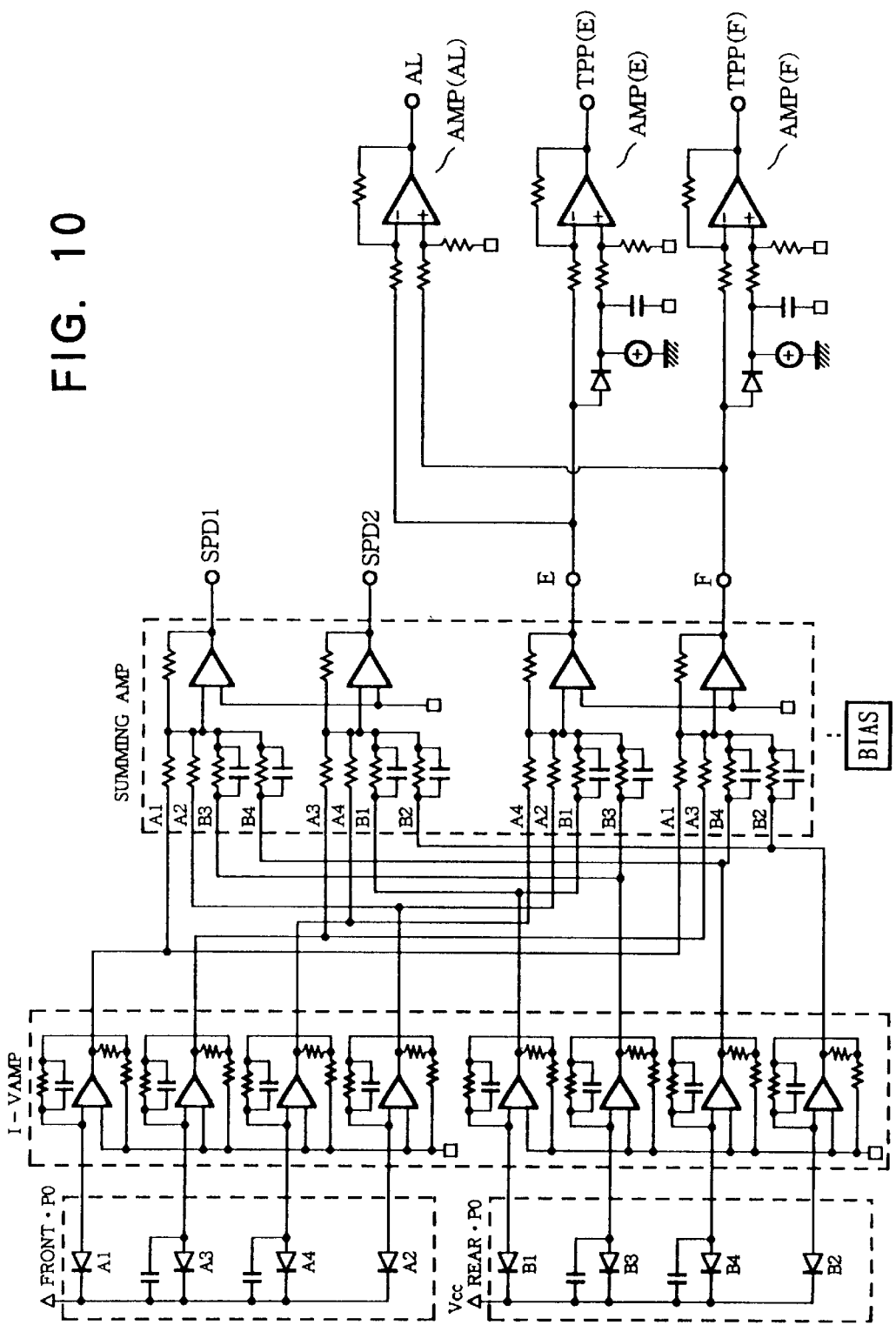
FIG. 10 is a view of an actual circuit configuration of a signal processing circuit in a laser coupler LC.

FIG. 10 is a view of the circuit configuration of an actual signal processing circuit in the laser coupler LC.

The detection signals from the front PD and rear PD are respectively amplified up to the predetermined signal levels in a current/voltage conversion and amplification circuit I-VAMP accommodating a current/voltage (I/V) conversion circuit and an amplification circuit (AMP). The above signals, SPD1, SPD2, E, and F are calculated at a sum operational amplification circuit SUMMING AMP. Further, the alignment signal AL is calculated in the operational amplification circuit AMP (AL), the top hold first sum signal TPP (E) is calculated in the operational amplification circuit AMP (E), and the top hold second sum signal TPP (F) is calculated in the operational amplification circuit AMP (F).

In the sum operation circuit SUMMING AMP, a bias is added from a bias circuit BIAS.

Circuit of Embodiment 3

Figure 11:
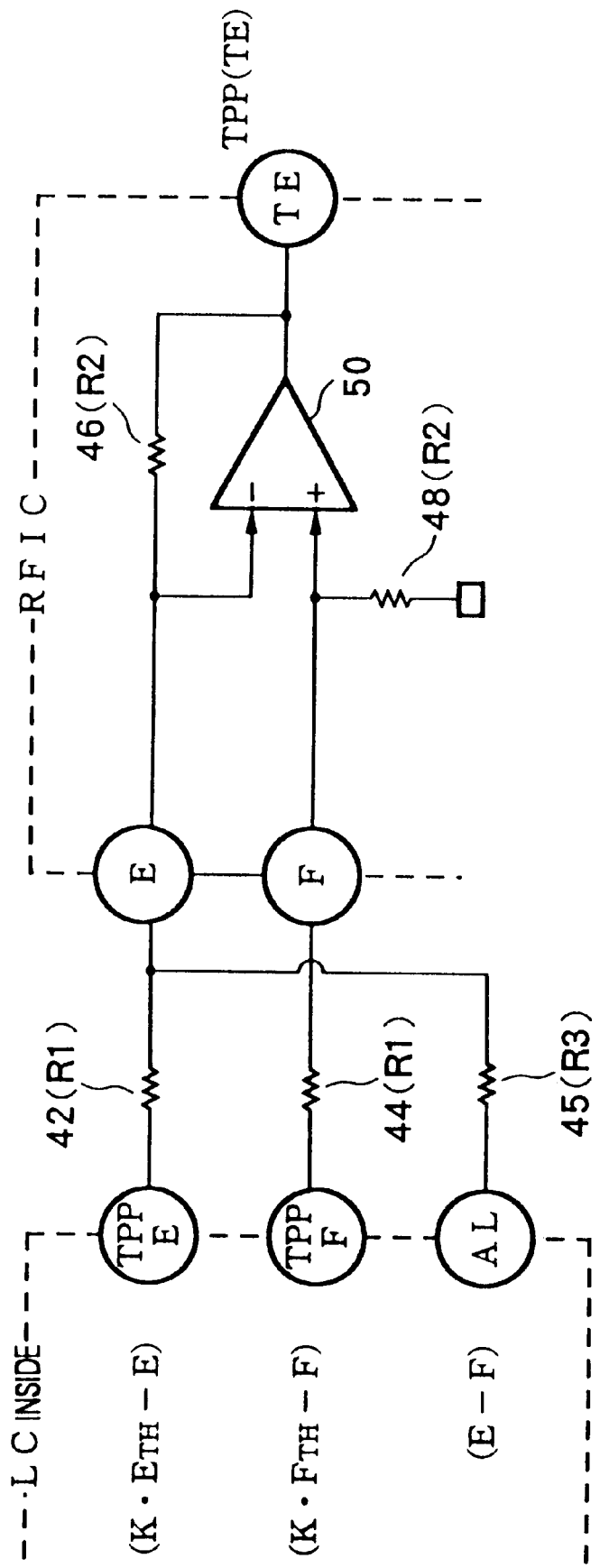
FIG. 11 is a view showing the circuit of a third embodiment for calculating the tracking error signal of the present invention.

FIG. 11 is a view of the circuit configuration of a third embodiment for calculating the top hold tracking error (TPP (TE)) signal from the top hold first sum signal TPP (E) and the top hold second sum signal TPP (F) obtained at the top hold push-pull signal calculation circuit 20 shown in FIG. 8.

The circuit of FIG. 11 is a circuit for substantially changing the TPP calculation coefficient K in the circuit illustrated in FIG. 9.

The laser coupler LC shown in FIG. 1, as shown in FIG. 8 and FIG. 11, outputs the top hold first sum signal TPP (E), the top hold second sum signal TPP (F), and the alignment signal AL.

In order to calculate the top hold tracking error signal TPP (TE), resistors 42 and 44 of a resistance value R1, a resistor 45 of a resistance value R3, and the radio frequency integrated circuit RFIC are provided outside of the laser coupler LC. The differential amplification circuit 50, the negative feedback resistor 46 thereof, and a positive feedback resistor 48 are provided in the radio frequency integrated circuit RFIC. The resistance values of the negative feedback resistor 46 and the positive feedback resistor 48 are R2.

In the circuit illustrated in FIG. 11, a resistor 45 of a resistance value R3 for adding the alignment signal AL to the top hold first sum signal TPP (E) and applying the same to the inversion terminal (−) of the amplification circuit 50 is added to the circuit illustrated in FIG. 9.

The top hold tracking error signal TPP (TE) is represented by the following equation:

$$TPP(TE) = (R2/R1) \times [(E-F) - K(E_{TP} - F_{TP})] - \quad (9)$$
$$(R2/R3)(E-F)$$
$$= (R2/R1) \times [(E-F) - (R2/R3)(E-F)]$$
$$= -(R2/R1)[K(E_{TP} - F_{TP})]$$
$$= [(R2(R3-R2))/(R1R3)](E-F) - K'_1(E_{TP} - F_{TP})]$$

Where, $K_1' = (R3(R3-R2)) \times K$.

The circuit illustrated in FIG. 11 has the advantage that the TPP calculation coefficient K can be made larger when compared with the circuit illustrated in FIG. 9 since the constant (coefficient) which becomes $K_1' = (R3/(R3-R2)) \times K$ is multiplied with $(E_{TP} - F_{TP})$.

The optimum value of the TPP calculation coefficient K is different according to the optical disc apparatus due to inherent variations in characteristics of individual optical disc apparatus. However, the TPP calculation coefficient is set constant in the laser coupler LC, therefore is usually fixed for all optical disc apparatus of the same model. Therefore, in the adjustment stage, where it is desired to change the same to the optimum TPP calculation coefficient K (where it is desired to make the coefficient K large in the present embodiment), when adopting the circuit configuration of FIG. 11, there is an advantage that the change becomes possible outside of the laser coupler LC.

Further, it is also possible to set the outer attached resistors 42, 44 and 45 of the laser coupler LC and the radio frequency integrated circuit RFIC as variable resistors and to adjust their resistance values to appropriately adjust the TPP calculation coefficient K, in other words, the gain of the top hold first sum signal TPP (E).

The resistors 46 and 48 illustrated inside the radio frequency integrated circuit RFIC in FIG. 11 can be provided outside as well. This is because not only does the provision of the resistors 46 and 48 outside of the radio frequency integrated circuit RFIC make the gain adjustment resistors variable and raise the degree of freedom of the gain adjustment, but also there are cases where it is not preferred to include the resistors 46 and 48 having large resistance values in the IC circuit of the radio frequency integrated circuit RFIC.

Circuit of Embodiment 4

Figure 12:
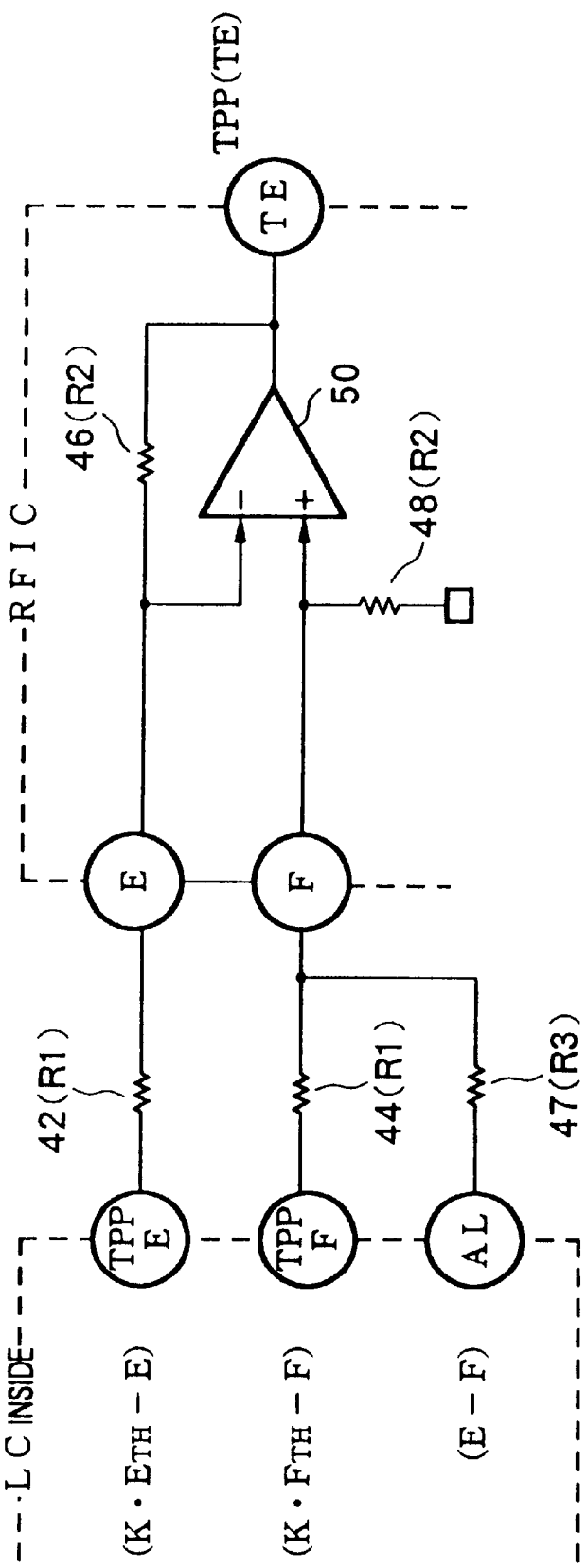
FIG. 12 is a view showing the circuit of a fourth embodiment for calculating the tracking error signal of the present invention.

FIG. 12 is a view of the circuit configuration of a fourth embodiment for calculating the top hold tracking error (TPP (TE)) signal from the top hold first sum signal TPP (E) and the top hold second sum signal TPP (F) obtained at the top hold push-pull signal calculation circuit 20 shown in FIG. 8.

The circuit of FIG. 12 is a circuit enabling the TPP calculation coefficient K in the circuit illustrated in FIG. 9 to be made small.

The optimum value of the TPP calculation coefficient K differs according to the optical disc apparatus due to inherent variations of characteristics of individual optical disc apparatus. However, the TPP calculation coefficient is set constant in the laser coupler LC, therefore is usually fixed for all optical disc apparatus of the same model. Therefore, in the adjustment stage, where it is desired to change the same to the optimum TPP calculation coefficient K (where it is desired to make the coefficient K large in the present embodiment), the circuit configuration of FIG. 12 is adopted.

The laser coupler LC outputs the top hold first sum signal TPP (E), top hold second sum signal TPP (F), and alignment signal AL.

In order to calculate the top hold tracking error signal TPP (TE), resistors 42 and 44 of a resistance value R1, a resistor 47 of a resistance value R3, and the radio frequency integrated circuit RFIC are provided outside of the laser coupler LC. The differential amplification circuit 50, the negative feedback resistor 46 thereof, and the positive feedback resistor 48 are provided in the radio frequency integrated circuit RFIC. The resistance values of the negative feedback resistor 46 and the positive feedback resistor 48 are R2.

In the circuit illustrated in FIG. 12, a resistor 45 of the resistance value R3 for adding the alignment signal AL to the top hold second sum signal TPP (F) and applying the same to the non-inversion terminal (+) of the amplification circuit 50 is added to the circuit illustrated in FIG. 9.

The top hold tracking error signal TPP (TE) is represented by the following equation:

$$TPP(TE) = (R2/R1) \times [(E-F) - K(E_{TP} - F_{TP})] + \quad (10)$$
$$(R2/(R3+R2))(1+R2/R1)(E-F)$$
$$= [(R2/R1(R1+2R2+R3)/(R2+R3)]/(R1R3) \times$$
$$[(E-F) - K'_2(E_{TP} - F_{TP})]$$

Where, $K_2' = [(R2+R3)]/(R1+2R2+R3)] \times K$.

The circuit illustrated in FIG. 12 has the advantage that the TPP calculation coefficient K can be made smaller compared with the circuit illustrated in FIG. 9 since the constant (coefficient) which becomes $K_2' = (R2+R3)]/(R1+2R2+R3) \times K$ is multiplied with $(E_{TP} - F_{TP})$.

It is also possible to set the outer attached resistors 42, 44, and 47 of the laser coupler LC and the radio frequency integrated circuit RFIC as variable resistors and adjust their resistance values to appropriately adjust the gain of the top hold second sum signal TPP (F). By providing the resistors 42, 44, and 47 outside of the laser coupler LC and the radio frequency integrated circuit RFIC in this way, the adjustment of the gain becomes easy.

The resistors 46 and 48 illustrated inside the radio frequency integrated circuit RFIC in FIG. 12 can be provided outside as well as mentioned by referring to FIG. 11. Namely, this is because not only does the provision of the resistors 46 and 48 outside of the radio frequency integrated circuit RFIC make the gain adjustment resistors variable and raise the degree of freedom of the gain adjustment, but also there are cases where it is not preferred to include the resistors 46 and 48 having a large resistance value in the IC circuit of the radio frequency integrated circuit RFIC.

Circuit of Embodiment 2 to Circuit of Embodiment 4

The circuit of Embodiment 2 shown in FIG. 9 shows the basic circuit for calculating the top hold tracking error signal TPP (TE).

The circuit of Embodiment 3 shown in FIG. 11 can be used when making the TPP calculation coefficient K large from the outside of the laser coupler LC and RFIC.

The circuit of Embodiment 4 shown in FIG. 12 can be used when making the TPP calculation coefficient K small from the outside of the laser coupler LC and RFIC.

Further, in order to make it possible to make the TPP calculation coefficient K large and small from the outside of the laser coupler LC and RFIC, the resistor 42 and/or resistor 44 may be replaced by variable resistors thereby making it possible to change the amplification rate of the differential amplification circuit 50 in the RFIC.

Circuit of Fifth Embodiment: Imparting Frequency Dependency to the TPP Calculation Coefficient FIG. 13 is a graph illustrating the relationship between the frequency and the TPP calculation coefficient.

By using the alignment signal AL through the low-pass filter, for example, the TPP calculation coefficient K is set to 0.68 at 60 Hz or more and the TPP calculation coefficient K is raised to 0.72 at 60 Hz or less.

The low pass filter circuit for passing only the low frequency component of the alignment signal AL for changing the TPP calculation coefficient K in accordance with the frequency band will be explained by referring to FIG. 14.

Figure 13:
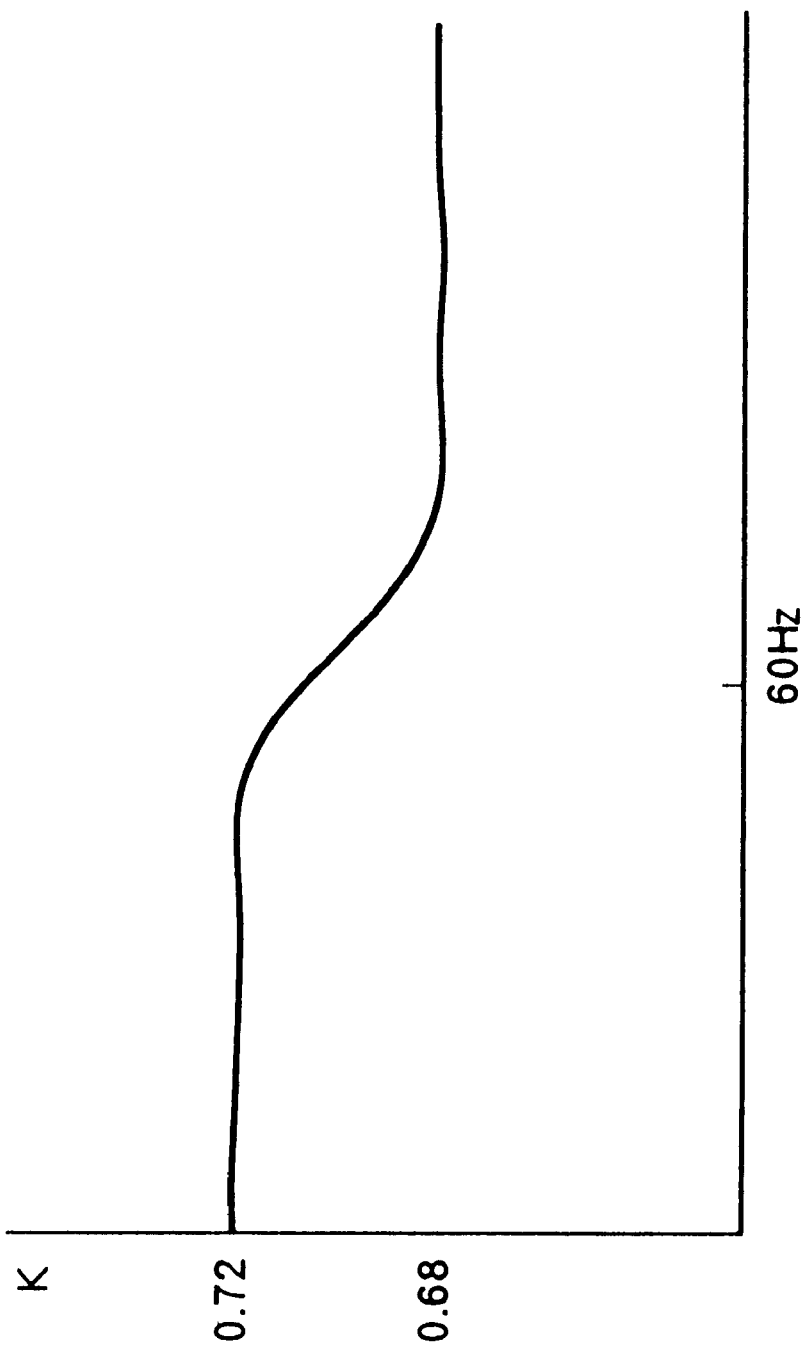
FIG. 13 is a graph illustration the frequency dependency of the TPP calculation coefficient.
Figure 14:
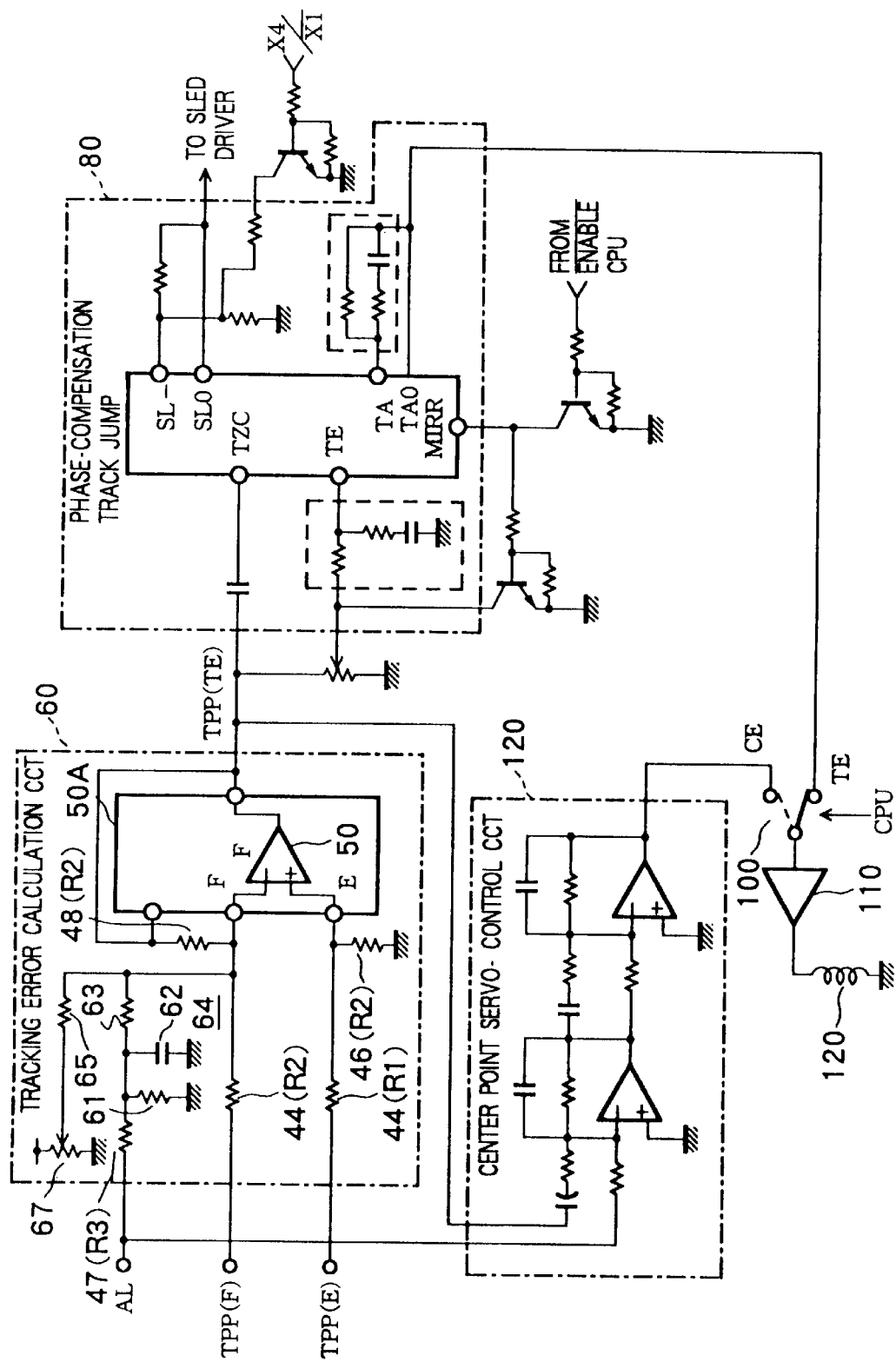
FIG. 14 is a view showing a detailed circuit of a circuit of a fourth embodiment for calculating the tracking error signal of the present invention, and the circuit of the related parts.

FIG. 14 is a view showing an actual tracking error calculation circuit 60 of Embodiment 5 in which the TPP calculation coefficient shown in FIG. 13 is changed with a frequency dependency and related circuits.

In the tracking error calculation circuit 60, resistors 46 and 48 are provided outside of the integrated circuit chip 50A corresponding to the RFIC of FIG. 12. Inside the integrated circuit chip 50A, the differential amplification circuit 50 in the RFIC shown in FIG. 14 and the peripheral circuit thereof are accommodated. By providing the resistors 46 and 48 outside of the integrated circuit chip 50A in this way, the difficulty of mounting resistors having a large resistance value in the semiconductor integrated circuit is avoided, and, the mounting of the resistors 46 and 48 as the outer attached resistors is facilitated similar to the resistors 42 and 44, and also the change thereof is facilitated.

At the rear of the resistor 47 which guides the alignment signal AL, a low pass filter 64 constituted by a resistor 61, a capacitor 62, and a resistor 63 is provided. By providing this low pass filter 64, the low frequency component of the alignment signal AL is passed, and as illustrated in FIG. 13, the value of the TPP calculation coefficient K is made large in the low frequency region. In the high frequency region, a TPP calculation coefficient having a small value will be used.

Further, in parallel to a serial circuit of the resistor 47 and the low pass filter 64, a serial circuit of a variable resistor 67 and a resistor 65 is provided. The adjustment of the signal level of the low pass filter 64 is enabled by the resistor 65 and the variable resistor 67.

Namely, in this tracking error calculation circuit 60, the change of the TPP calculation coefficient K in accordance with the frequency band is enabled by providing the low pass filter 64 including the capacitor 62.

This top hold tracking error signal TPP (TE) is phase-compensated in a phase compensation track jump circuit 80 for generating the signal for making the sled shown in FIG. 15 perform the track jump operation, and a tracking coil 120 is driven via the signal which passes through a switch circuit 100 and is applied to a tracking driver circuit 110.

Note that, the phase compensation track jump operation itself is not directly related to the present invention, and therefore, the details thereof will not be described.

An inverted ENABLE signal is a signal for determining the operation timing given from a CPU such as a microcomputer for performing the tracking servo control.

The top hold tracking error signal TPP (TE) calculated in the tracking error calculation circuit 60 is applied to the middle point servo control circuit 120 for controlling the optical pick-up to the middle point position of the track when performing the coarse control for moving the optical pick-up to the vicinity of the track and is used for the generation of the middle point servo control signal CE together with the alignment signal AL.

FIG. 16 shows the operation of the middle point servo control, but this is not directly related to the present invention, therefore, the details thereof will not be described.

As the optical recording apparatus of the present invention, a magneto-optical disc apparatus, CD drive, etc. were mentioned above. The signal processing was explained above for the top hold tracking error signal TPP (TE) used in these apparatuses. The present invention however is not limited to the magneto-optical disc apparatus, CD drive, etc. and can be applied to other optical recording apparatuses using a tracking error signal.

The top hold tracking error signal TPP (TE) according to the present invention contains almost no offset, therefore the control of the tracking servo in the optical recording apparatus is correctly carried out. Particularly, in the present invention, the adjustment of the top hold coefficient is enabled, therefore it is possible to easily cope with variations of characteristics of optical disc apparatus. Further, in the present invention, the top hold coefficient is changed in accordance with the frequency band, and therefore a more correct tracking error signal can be calculated.

Further, in the present invention, by considering the condition due to the configuration of the optical disc apparatus, the conditions regarding the tracking error signal, particularly the value of the top hold coefficient, can be easily changed.

What is claimed is:

1. A tracking error signal calculation circuit for calculating a tracking error signal in an optical disc apparatus having a light receiving means for outputting first and second received light detection signals from regions located at the two sides of the center of a track of a disc-like recording medium, said circuit comprising:

a first calculation circuit for detecting a peak of the first received light detection signal from the light receiving means and subtracting a signal obtained by multiplying a first coefficient with the peak from the first received light detection signal to calculate a first calculation signal;

a first coefficient changing circuit for changing the first coefficient, wherein the first coefficient changing circuit has a circuit for changing the first coefficient depending upon a frequency of the first received light detection signal;

a second calculation circuit for detecting a peak of the second received light detection signal from the light receiving means and subtracting a signal obtained by multiplying a second coefficient with the peak from the second received light detection signal to calculate a second calculation signal; and a third calculation circuit for subtracting the second calculation signal from the first calculation signal to calculate the tracking error signal.

2. A tracking error signal calculation circuit as set forth in claim 1, further comprising a second coefficient changing circuit for changing the second coefficient.

3. A tracking error signal calculation circuit as set forth in claim 2, wherein the second coefficient changing circuit has a circuit for changing the second coefficient depending upon a frequency of the second received light detection signal.

4. An optical disc apparatus, comprising:

a disc recording medium, an optical pick-up, a signal calculation circuit provided outside of the optical pick-up, and a tracking controlling means for performing position control of the optical pick-up to a predetermined track, wherein said optical pick-up includes:

an optical means for emitting a converged beam to a recording surface of the disc recording medium, a light receiving means for receiving a returned light from the recording surface of the disc recording medium from regions located at two sides of the center of a track of the disc recording medium and outputting first and second received light detection signals, a first calculation circuit for detecting a peak of the first received light detection signal from the light receiving means and subtracting a signal obtained by multiplying a first coefficient with the peak from the first received light detection signal to calculate the first calculation signal, and a second calculation circuit for detecting a peak of the second received light detection signal from the light receiving means and subtracting a signal obtained by multiplying a second coefficient to the peak from the second received light detection signal to calculate the second calculation signal;

wherein the signal calculation circuit has a third calculation circuit for subtracting the second calculation signal from the first calculation signal to calculate a tracking error signal, wherein the signal calculation circuit has a coefficient changing circuit for changing the first coefficient and outputs the first calculation signal operated on by the changed first coefficient to the third calculation circuit, and wherein the coefficient changing circuit has a circuit for changing the first coefficient in response to a frequency of the first received light detection signal.

5. An optical disc apparatus as set forth in claim 4, wherein the signal calculation circuit has a second coefficient changing circuit for changing the second coefficient and outputs the second calculation signal operated on by the changed second coefficient to the third calculation circuit.

6. An optical disc apparatus as get forth in claim 5, wherein the coefficient changing circuit has a circuit for changing the second coefficient in response to a frequency of the second received light detection signal.

7. An optical disc apparatus as set forth in claim 4, wherein:

the light receiving means has two light receiving elements provided along a light axis of the returned light;

the first light receiving element is provided so as to receive the returned light from the recording surface of the disc recording medium from the regions located at the two sides of the center of the track of the disc recording medium and output the first and second signals;

the second light receiving element is provided so as to receive the returned light from the recording surface of the disc recording medium from the regions located at the two sides of to the center of the track of the disc recording medium and output third and fourth signals in an inverse phase relationship from corresponding regions of the light axis; and the light receiving means adds the first signal and the fourth signal in the same phase relationship, outputs the same as the first received light detection signal, adds the second signal and the third signal which are in the inverse phase relationship to the first received light detection signal, but in the same phase relationship as each other, and outputs the same as the second received light detection signal.

8. A tracking control apparatus in an optical disc apparatus, for reproducing a signal from and/or for recording a signal to a disk-like recording medium, said tracking control apparatus comprising:

a light collection means for collecting a light beam emitted from a light source toward the disc-like recording medium;

a light receiving means, comprising first and second divided light receiving element groups, for receiving a light beam reflected at the disc-like recording medium to output first and second light received detection signals corresponding to regions positioned at both sides with respect to a signal track center of the disc-like recording medium;

a first calculation means for calculating a first calculation signal from the first received light detection signal detected at the light receiving means by using a first coefficient;

a second calculation means for calculating a second calculation signal from the second received light detection signal detected at the light receiving means by using a second coefficient;

a coefficient changing means for changing the first and second coefficients, wherein the coefficient changing means comprises a circuit for changing the first and second coefficients in response to frequencies of the first and second received light detection signals;

a third calculation means for calculating a tracking error signal from the first and second calculation signals; and a tracking servo means for tracking-servo-controlling the light collection means by using the tracking error signal calculated at the third calculation means.

9. A tracking control apparatus as set forth in claim 8, wherein the light collection means forms a single light spot of the light beam on the disc-like recording medium.

10. A tracking control apparatus as set forth in claim 8, wherein the object lens forms a single light spot of the light beam on the disc-like recording medium.

11. A tracking error signal calculation method for calculating the tracking error signal in an optical disc apparatus having a light receiving means for outputting first and second received light detection signals from regions located at two sides of a center of a track of a disc-like recording medium, including the steps of:

detecting a peak of the first received light detection signal from the first received light detection signal and subtracting the signal obtained by multiplying a first coefficient with the peak from the first received light detection signal to calculate a first calculation signal;

detecting a peak of the second received light detection signal from the second received light detection signal and subtracting the signal obtained by multiplying a second coefficient with the peak from the second received light detection signal to calculate a second calculation signal;

performing a calculation on at least one of the first calculation signal and the second calculation signal so that at least one of the first coefficient and the second coefficient changes in response to a frequency band of at least one of the first received light detection signal and the second received light detection signal; and generating the tracking error signal by subtracting the second calculation signal from the first calculation signal.

12. The method of claim 11, wherein the step of performing comprises the steps of:

detecting the frequency band of the first received light detection signal; and changing the first coefficient in response to the detected frequency band.

13. The method of claim 12, further comprising the steps of:

detecting the frequency band of the second received light detection signal; and changing the second coefficient in response to the detected frequency band of the second received light detection signal.

14. The method of claim 11, wherein the step of performing comprises the steps of:

detecting the frequency band of the second received light detection signal; and changing the second coefficient in response to the detected frequency band.

15. An optical disc apparatus, comprising:

a disc recording medium, an optical pick-up, a signal calculation circuit provided outside of the optical pick-up, and a tracking driver circuit configured to perform position control of the optical pick-up to a predetermined track, wherein said optical pick-up includes:

a laser diode configured to emit a converged beam to a recording surface of the disc recording medium, at least one photodiode configured to receive a returned light from the recording surface of the disc recording medium from regions located at two sides of the center of a track of the disc recording medium and outputting first and second received light detection signals, a first calculation circuit for detecting a peak of the first received light detection signal from the at least one photodiode and subtracting a signal obtained by multiplying a first coefficient with the peak from the first received light detection signal to calculate the first calculation signal, and a second calculation circuit for detecting a peak of the second received light detection signal from the at least one photodiode and subtracting a signal obtained by multiplying a second coefficient to the peak from the second received light detection signal to calculate the second calculation signal;

wherein the signal calculation circuit has a third calculation circuit for subtracting the second calculation signal from the first calculation signal to calculate a tracking error signal, wherein the signal calculation circuit has a coefficient changing circuit for changing the first coefficient and outputs the first calculation signal operated on by the changed first coefficient to the third calculation circuit, and wherein the coefficient changing circuit has a circuit for changing the first coefficient in response to a frequency of the first received light detection signal.

16. An optical disc apparatus as set forth in claim 15, wherein the signal calculation circuit has a second coefficient changing circuit for changing the second coefficient and outputs the second calculation signal operated on by the changed second coefficient to the third calculation circuit.

17. An optical disc apparatus as get forth in claim 16, wherein the coefficient changing circuit has a circuit for changing the second coefficient in response to a frequency of the second received light detection signal.

18. An optical disc apparatus as set forth in claim 15, wherein:

the at least one photodiode comprises two light receiving elements provided along a light axis of the returned light;

the first light receiving element is provided so as to receive the returned light from the recording surface of the disc recording medium from the regions located at the two sides of the center of the track of the disc recording medium and output the first and second signals;

the second light receiving element is provided so as to receive the returned light from the recording surface of the disc recording medium from the regions located at the two sides of to the center of the track of the disc recording medium and output third and fourth signals in an inverse phase relationship from corresponding regions of the light axis; and the at least one photodiode is configured to add the first signal and the fourth signal in the same phase relationship, to output the same as the first received light detection signal, to add the second signal and the third signal which are in the inverse phase relationship to the first received light detection signal, but in the same phase relationship as each other, and to output the same as the second received light detection signal.

19. A tracking control apparatus in an optical disc apparatus, for reproducing a signal from and/or for recording a signal to a disk-like recording medium, said tracking control apparatus comprising:

an object lens configured to collect a light beam emitted from a light source toward the disc-like recording medium;

at least one photodiode, comprising first and second divided light receiving element groups, configured to receive a light beam reflected at the disc-like recording medium to output first and second light received detection signals corresponding to regions positioned at both sides with respect to a signal track center of the disc-like recording medium;

a first calculation circuit configured to calculate a first calculation signal from the first received light detection signal detected at the at least one photodiode by using a first coefficient;

a second calculation circuit configured to calculate a second calculation signal from the second received light detection signal detected at the at least one photodiode by using a second coefficient;

a coefficient changing circuit for changing the first and second coefficients in response to frequencies of the first and second received light detection signals;

a third calculation circuit configured to calculate a tracking error signal from the first and second calculation signals; and a tracking driver circuit configured to tracking-servo-control the object lens by using the tracking error signal calculated at the third calculation circuit.

* * * * *